US012650690B2

(12) United States Patent
Tagata et al.

(10) Patent No.: US 12,650,690 B2
(45) Date of Patent: Jun. 9, 2026

(54) WATERCRAFT PROPULSION SYSTEM, AND WATERCRAFT INCLUDING THE WATERCRAFT PROPULSION SYSTEM

(71) Applicant: YAMAHA HATSUDOKI KABUSHIKI KAISHA, Iwata (JP)

(72) Inventors: Akihiro Tagata, Shizuoka (JP); Katsutoshi Naito, Shizuoka (JP); Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 374 days.

(21) Appl. No.: 18/503,472

(22) Filed: Nov. 7, 2023

(65) Prior Publication Data

US 2024/0152146 A1     May 9, 2024

(30) Foreign Application Priority Data

Nov. 8, 2022     (JP) ................................. 2022-178985

(51) Int. Cl.
| | |
|---|---|
| *G05D 1/00* | (2006.01) |
| *B63H 25/04* | (2006.01) |
| *B63H 20/08* | (2006.01) |

(52) U.S. Cl.
CPC ........... *G05D 1/0206* (2013.01); *B63H 25/04* (2013.01); *B63H 20/08* (2013.01)

(58) Field of Classification Search
CPC ....... G05D 1/0206; B63H 25/04; B63H 20/08
See application file for complete search history.

(56) References Cited

U.S. PATENT DOCUMENTS

| | | | | |
|---|---|---|---|---|
| 7,818,108 B2 * | 10/2010 | Bertazzoni | ............. | B63H 25/42 |
| | | | | 701/44 |
| 7,883,383 B2 * | 2/2011 | Larsson | ............... | G05D 1/0206 |
| | | | | 440/1 |

(Continued)

FOREIGN PATENT DOCUMENTS

| | | | | | |
|---|---|---|---|---|---|
| EP | | 3434581 A1 * | 1/2019 | ............. | B63H 25/02 |
| EP | | 3437986 A1 * | 2/2019 | ............... | B63H 5/08 |

(Continued)

OTHER PUBLICATIONS

Official Communication issued in corresponding European Patent Application No. 23208424.4, mailed on Apr. 9, 2024.

*Primary Examiner* — Marc Q Jimenez
*Assistant Examiner* — Jovon E Hayes
(74) *Attorney, Agent, or Firm* — Keating & Bennett, LLP

(57) ABSTRACT

A watercraft propulsion system includes a bow thruster, at least two propulsion devices, a translation/bow turning operator to apply a translation command to translate a hull and a bow turning command to turn a bow of the hull, and a controller configured or programmed to drive the bow thruster, and drive one of the at least two propulsion devices forward and another of the at least two propulsion devices in reverse while controlling the steering angles of the at least two propulsion devices so that propulsive force action lines of the at least two propulsion devices cross each other in the hull in a translation watercraft maneuvering mode to translate the hull in response to an operation of the translation/ bow turning operator. The controller includes a calibration mode in which calibration is performed for the translation watercraft maneuvering mode.

11 Claims, 11 Drawing Sheets

1

(56) References Cited

U.S. PATENT DOCUMENTS

| 11,372,412 | B1 * | 6/2022 | Yamaguchi | ............ | B63H 20/12 |
| 2014/0046515 | A1 * | 2/2014 | Mizutani | ................ | B63H 20/08 |
| | | | | | 701/21 |
| 2017/0305520 | A1 * | 10/2017 | Watanabe | .............. | B63H 25/42 |
| 2020/0331578 | A1 * | 10/2020 | Sakashita | ............... | B63H 5/125 |
| 2025/0050999 | A1 * | 2/2025 | Moromi | ................. | B63B 79/10 |

FOREIGN PATENT DOCUMENTS

| JP | 2008184127 | A | * | 8/2008 | ............ | B63H 25/42 |
| JP | 2013014173 | A | * | 1/2013 | ............ | B63H 25/02 |
| WO | WO-2020069750 | A1 | * | 4/2020 | .......... | G05D 1/0206 |

* cited by examiner

WATERCRAFT PROPULSION SYSTEM, AND WATERCRAFT INCLUDING THE WATERCRAFT PROPULSION SYSTEM

CROSS REFERENCE TO RELATED APPLICATIONS

This application claims the benefit of priority to Japanese Patent Application No. 2022-178985 filed on Nov. 8, 2022. The entire contents of this application are hereby incorporated herein by reference.

BACKGROUND OF THE INVENTION

1. Field of the Invention

The present invention relates to a watercraft propulsion system, and a watercraft including the watercraft propulsion system.

2. Description of the Related Art

US 2017/0305520 A1 discloses a watercraft maneuvering system including two engines that respectively rotate portside and starboard-side forward/reverse propellers, and a side thruster that generates a lateral propulsive force. A watercraft maneuvering operation is performed by changing the directions of water jets generated by the forward/reverse propellers by means of rudders connected to a steering wheel and by operating a joystick lever. Specifically, the forward/reverse propellers and the side thruster are controlled by operating the joystick lever such that a lateral movement and an oblique movement can be achieved. In US 2017/0305520 A1, calibration for cancellation of a rotation moment in the lateral movement and the oblique movement is also described.

SUMMARY OF THE INVENTION

The inventors of preferred embodiments of the present invention described and claimed in the present application conducted an extensive study and research regarding a watercraft propulsion system, such as the one described above, and in doing so, discovered and first recognized new unique challenges and previously unrecognized possibilities for improvements as described in greater detail below.

In the watercraft maneuvering system disclosed in US 2017/0305520 A1, the rudders are not associated with the operation of the joystick lever. Therefore, the calibration described in US 2017/0305520 A1 is not necessarily suitable for a watercraft propulsion system which includes propulsion devices provided on the stern of a hull and is adapted to translate the hull by steering the propulsion devices.

In view of the foregoing, preferred embodiments of the present invention provide watercraft propulsion systems and watercraft, each of which have a calibration mode in which propulsion devices provided on the stern of a hull can be properly steered for the translation or the like of the hull.

In order to overcome the previously unrecognized and unsolved challenges described above, a preferred embodiment of the present invention provides a watercraft propulsion system including a bow thruster at a bow of a hull to generate a lateral propulsive force, at least two propulsion devices on a stern of the hull each having a variable steering angle, a translation/bow turning operator to be operated by a user (an operator) to apply a translation command to translate the hull and a bow turning command to turn the bow of the hull, and a controller configured or programmed to control the bow thruster and the at least two propulsion devices. The controller is configured or programmed to, in a translation watercraft maneuvering mode, drive the bow thruster, and drive one of the at least two propulsion devices forward and drive another of the at least two propulsion devices in reverse while controlling the steering angles of the at least two propulsion devices so that the propulsive force action lines of the at least two propulsion devices cross each other in the hull to translate the hull in response to the operation of the translation/bow turning operator. The controller includes a calibration mode in which calibration is performed for the translation watercraft maneuvering mode.

With this arrangement, a control operation is performed according to the translation watercraft maneuvering mode for the translation of the hull by utilizing the propulsive force of the bow thruster and the propulsive forces of the at least two propulsion devices provided on the stern. The steering angles of the at least two stern propulsion devices are controlled so that the propulsive force action lines of the at least two propulsion devices cross each other in the hull, and one of the at least two propulsion devices is driven forward and another of the at least two propulsion devices is driven in reverse. Thus, the resultant propulsive force of the at least two propulsion devices (the resultant force of the propulsive forces generated by the at least two propulsion devices) acts on the hull at the intersection of the propulsive force action lines, and applies a lateral propulsive force component to the hull laterally of the hull. A balance between a bow turning moment to be applied to the hull by the resultant propulsive force and a bow turning moment to be applied to the hull by the propulsive force of the bow thruster is properly adjusted to achieve the translation of the hull.

In a preferred embodiment of the present invention, the controller is configured or programmed to control the bow thruster and the at least two propulsion devices according to the translation command and the bow turning command applied by the translation/bow turning operator in the calibration mode. The controller is configured or programmed to increase the output of the bow thruster when the bow turning command is a bow turning promoting command that commands bow turning in a direction indicated by the translation command, and to reduce the absolute values of the steering angles of the at least two propulsion devices (or to narrow an angle defined between the at least two propulsion devices) when the bow turning promoting command is still applied even after the output of the bow thruster reaches its upper limit.

With this arrangement, in the calibration of the translation watercraft maneuvering mode, the bow turning of the hull is promoted by increasing the output of the bow thruster when the bow turning promoting command that commands the bow turning in the direction indicated by the translation command is applied. When the bow turning promoting command is still applied even after the output of the bow thruster reaches its upper limit, the absolute values of the steering angles of the at least two propulsion devices are reduced to further promote the bow turning. When the adjustment is insufficient even after the output of the bow thruster is thus increased, the absolute values of the steering angles of the stern propulsion devices are reduced. Therefore, the proper translation state of the hull can be reliably achieved. In addition, the absolute values of the steering angles can be maximized (the angle defined between the at least two propulsion devices can be expanded). Therefore, the calibration can be performed so as to efficiently utilize the lateral component of the resultant force of the propulsive forces generated by the stern propulsion devices.

In a preferred embodiment of the present invention, the controller is configured or programmed to control the bow thruster and the at least two propulsion devices according to the translation command and the bow turning command applied by the translation/bow turning operator in the calibration mode. The controller is configured or programmed to increase the absolute values of the steering angles of the at least two propulsion devices when the bow turning command is a bow turning reduction command that commands bow turning in a direction opposite to the direction indicated by the translation command, and to reduce the output of the bow thruster when the bow turning reduction command is still applied even after the absolute values of the steering angles reach their upper limit.

With this arrangement, in calibration of the translation watercraft maneuvering mode, the bow turning of the hull is reduced by increasing the absolute values of the steering angles of the at least two propulsion devices when the bow turning reduction command that commands the bow turning in the direction opposite to the direction indicated by the translation command is applied. When the bow turning reduction command is still applied even after the absolute values of the steering angles reach their upper limit, the output of the bow thruster is reduced to further reduce the bow turning. When the adjustment is still insufficient even after the absolute values of the steering angles of the stern propulsion devices are thus increased, the output of the bow thruster is reduced. Therefore, the proper translation state of the hull can be reliably achieved. In addition, the absolute values of the steering angles can be maximized. Therefore, the calibration can be performed so as to efficiently utilize the lateral component of the resultant force of the propulsive forces generated by the stern propulsion devices.

In a preferred embodiment of the present invention, the watercraft propulsion system further includes a calibration ending operator to be operated by the user to end the calibration. The controller is configured or programmed to generate a calibration value based on the control states of the bow thruster and the at least two propulsion devices when the calibration ending operator is operated, and to store the calibration value in a memory. The control operation can be performed according to the translation watercraft maneuvering mode by utilizing the calibration value thus stored in the memory.

In a preferred embodiment of the present invention, the calibration value includes translation steering angles to which the steering angles of the at least two propulsion devices are to be set in the translation watercraft maneuvering mode, a reference ratio that indicates the ratio of the output of the bow thruster to the lateral component of a target thrust corresponding to the translation command applied by the translation/bow turning operator, and a forward/reverse thrust ratio that indicates a ratio between the propulsive force of one of the at least two propulsion devices driven forward and the propulsive force of another of the at least two propulsion devices driven in reverse.

In a preferred embodiment of the present invention, the controller is configured or programmed to control the output of the bow thruster, the steering angles of the at least two propulsion devices, and the propulsive forces of the at least two propulsion devices based on the calibration value when the translation command is applied by the translation/bow turning operator in the translation watercraft maneuvering mode. Thus, the control operation for the translation watercraft maneuvering mode can be performed based on the calibration value.

In a preferred embodiment of the present invention, the controller is configured or programmed to increase the output of the bow thruster, and reduce the absolute values of the steering angles of the propulsion devices when a bow turning command that commands the bow turning in the direction indicated by the translation command is applied by the translation/bow turning operator in the translation watercraft maneuvering mode.

In a preferred embodiment of the present invention, the controller is configured or programmed to reduce the output of the bow thruster and increase the absolute values of the steering angles of the propulsion devices when a bow turning command that commands the bow turning in the direction opposite to the direction indicted by the translation command is applied by the translation/bow turning operator in the translation watercraft maneuvering mode.

Thus, the control operation to be performed in the translation watercraft maneuvering mode is different from that to be performed in the calibration mode. Specifically, the output of the bow thruster and the absolute values of the steering angles of the stern propulsion devices are simultaneously increased or reduced according to the bow turning command. Thus, the bow turning behavior can be properly achieved in response to the bow turning command. Thus, a watercraft having an excellent maneuverability can be provided.

In a preferred embodiment of the present invention, the watercraft propulsion system further includes an upper output limit setter to be operated by the user to set the upper limit of the output of the bow thruster.

Calibration of the translation watercraft maneuvering mode is preferably performed based on the upper limit of the output of the bow thruster thus set. Thus, the calibration can be properly performed according to the setting of the upper limit of the output.

Another preferred embodiment of the present invention provides a watercraft including a hull and a watercraft propulsion system on the hull and including any of the aforementioned features.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
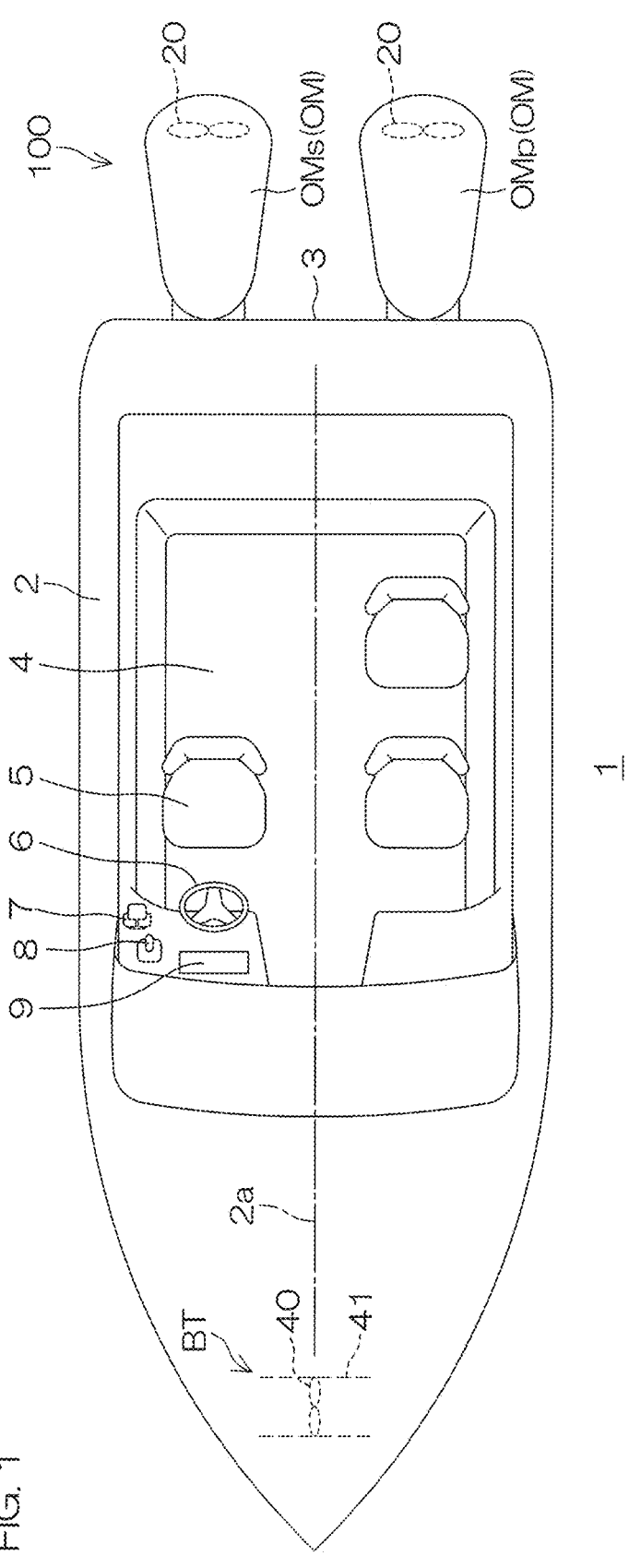
FIG. 1 is a plan view showing an exemplary construction of a watercraft mounted with a watercraft propulsion system according to a preferred embodiment of the present invention.

FIG. 1 is a plan view showing an exemplary construction of a watercraft 1 mounted with a watercraft propulsion system 100 according to a preferred embodiment of the present invention. The watercraft 1 includes a hull 2, a bow thruster BT provided at the bow of the hull 2 and able to generate a lateral propulsive force, and outboard motors OM (examples of the propulsion device) provided on the stern 3 of the hull 2 and each having a variable steering angle. In this preferred embodiment, a plurality of outboard motors OM, more specifically, two outboard motors OM are provided on the stern 3.

The two outboard motors OM are disposed side by side transversely of the hull 2 on the stern 3. For discrimination between the two outboard motors OM, one of the outboard motors OM disposed rightward relative to the other outboard motor OM is referred to as "starboard-side outboard motor OMs" and the other outboard motor OM disposed leftward relative to the one outboard motor OM is referred to as "port-side outboard motor OMp." In this example, the starboard-side outboard motor OMs is disposed on the right side of a center line 2a extending anteroposteriorly of the hull 2, and the port-side outboard motor OMp is disposed on the left side of the center line 2a. More specifically, the starboard-side outboard motor OMs and the port-side outboard motor OMp are disposed symmetrically with respect to the center line 2a.

The outboard motors OM each include a propeller 20 located underwater, and are each configured to generate a propulsive force by the rotation of the propeller 20 and apply the propulsive force to the hull 2. The outboard motors OM are each attached to the stern 3 pivotably leftward and rightward such that the direction of the propulsive force generated by the propeller 20 is changed leftward and rightward. The steering angle is defined, for example, as an angle between the direction of the propulsive force generated by the propeller 20 and an anteroposterior reference direction parallel to the center line 2a. The outboard motors OM are each configured to be pivoted leftward and rightward by a steering mechanism 26 thereof (see FIG. 2) to change the steering angle. When the propulsive force direction is parallel to the anteroposterior direction, the steering angle is zero. When the rear end of the outboard motor OM is directed rightward, the steering angle may be expressed with a positive sign. When the rear end of the outboard motor OM is directed leftward, the steering angle may be expressed with a negative sign.

The bow thruster BT includes a propeller 40 disposed in a tubular tunnel 41 extending through the bow portion of the hull 2 transversely of the hull 2. The propeller 40 is rotatable in a forward rotation direction and a reverse rotation direction, i.e., is bidirectionally rotatable such that the bow thruster BT can apply a rightward or leftward propulsive force to the hull 2. In this preferred embodiment, the direction of the propulsive force to be generated by the bow thruster BT cannot be set to a direction other than the rightward direction and the leftward direction.

A usable space 4 for passengers is provided inside the hull 2. A helm seat 5 is provided in the usable space 4. A steering wheel 6, a remote control lever 7, a joystick 8, a gauge 9 (display panel) and the like are provided in association with the helm seat 5. The steering wheel 6 is an operator to be operated by a user (an operator) to change the course of the watercraft 1. The remote control lever 7 is an operator to be operated by the user to change the magnitudes (outputs) and the directions (forward or reverse directions) of the propulsive forces of the outboard motors OM, and corresponds to an acceleration operator. The joystick 8 is an operator to be operated instead of the steering wheel 6 and the remote control lever 7 by the user during a watercraft maneuvering operation. An operator 45 (see FIG. 2) dedicated for the operation of the bow thruster BT may be provided in addition to the aforementioned operators.

Figure 2:
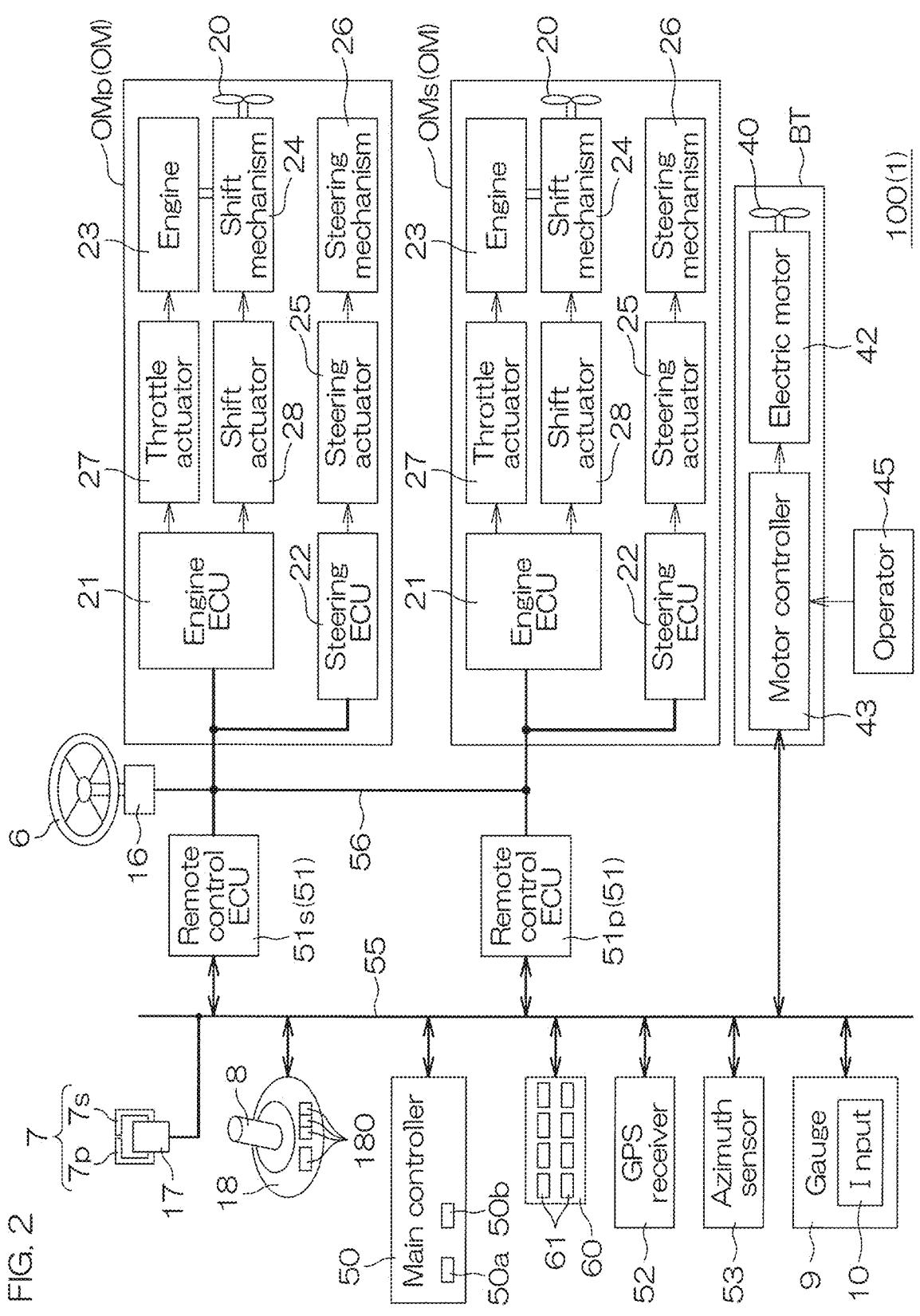
FIG. 2 is a block diagram showing a configuration of the watercraft propulsion system by way of example.

FIG. 2 is a block diagram showing the configuration of the watercraft propulsion system 100 provided in the watercraft 1 by way of example. The watercraft propulsion system 100 includes the two outboard motors OM and the bow thruster BT. The outboard motors OM may each be an engine outboard motor or an electric outboard motor. In FIG. 2, the outboard motors OM are engine outboard motors by way of example.

The outboard motors OM each include an engine ECU (Electronic Control Unit) 21, a steering ECU 22, an engine 23, a shift mechanism 24, a propeller 20, the steering mechanism 26 and the like. Power generated by the engine 23 is transmitted to the propeller 20 via the shift mechanism 24. The steering mechanism 26 is configured to pivot the body of the outboard motor OM leftward and rightward with respect to the hull 2 (see FIG. 1) to change the direction of the propulsive force generated by the outboard motor OM leftward and rightward. The shift mechanism 24 is configured to select a shift position from a forward shift position, a reverse shift position, and a neutral shift position. With the shift position set to the forward shift position, the propeller 20 is rotated in a forward rotation direction by the transmission of the rotation of the engine 23 such that the outboard motor OM is brought into a forward drive state to generate a forward propulsive force. With the shift position set to the reverse shift position, the propeller 20 is rotated in a reverse rotation direction by the transmission of the rotation of the engine 23 such that the outboard motor OM is brought into a reverse drive state to generate a reverse propulsive force. With the shift position set to the neutral shift position, the power transmission between the engine 23 and the propeller 20 is interrupted such that the outboard motor OM is brought into an idling state.

The outboard motors OM each further include a throttle actuator 27 and a shift actuator 28, which are controlled by the engine ECU 21. The throttle actuator 27 is an electric actuator (typically including an electric motor) that actuates the throttle valve (not shown) of the engine 23. The shift actuator 28 actuates the shift mechanism 24. The outboard motors OM each further include a steering actuator 25 to be controlled by the steering ECU 22. The steering actuator 25 is the drive source of the steering mechanism 26, and typically includes an electric motor. The steering actuator 25 may include a hydraulic device of electric pump type.

The bow thruster BT includes the propeller 40, an electric motor 42 that drives the propeller 40, and a motor controller 43 that controls the electric motor 42.

The watercraft propulsion system 100 further includes a main controller 50. The main controller 50 includes a processor 50*a* and a memory 50*b*, and is configured so that the processor 50*a* executes a program stored in the memory 50*b* to perform a plurality of functions. The main controller 50 is connected to an onboard network 55 (CAN: Control Area Network) provided in the hull 2. A remote control unit 17, two remote control ECUs 51, a joystick unit 18, a GPS (Global Positioning System) receiver 52, an azimuth sensor 53 and the like are connected to the onboard network 55.

The two remote control ECUs 51 (51*s*, 51*p*) are provided in association with the two outboard motors OM (OMs, OMp), respectively, and are connected to the onboard network 55. The engine ECU 21 and the steering ECU 22 of the starboard-side outboard motor OMs, and the engine ECU 21 and the steering ECU 22 of the port-side outboard motor OMp are connected to the corresponding remote control ECUs 51*s*, 51*p* via an outboard motor control network 56. The main controller 50 transmits and receives signals to/from various units connected to the onboard network 55 to control the outboard motors OM and the bow thruster BT, and further controls other units. The main controller 50 includes a plurality of control modes, and controls the units in predetermined manners according to the respective control modes.

A steering wheel unit 16 is connected to the outboard motor control network 56. The steering wheel unit 16 outputs an operation angle signal indicating the operation angle of the steering wheel 6 to the outboard motor control network 56. The operation angle signal is received by the remote control ECUs 51 and the steering ECUs 22. In response to the operation angle signal generated by the steering wheel unit 16 or steering angle commands respectively generated by the remote control ECUs 51, the steering ECUs 22 of the outboard motors OM respectively control the steering actuators 25 to control the steering angles of the outboard motors OM.

The remote control unit 17 generates an operation position signal indicating the operation position of the remote control lever 7. The remote control unit 17 includes a starboard-side remote control lever 7*s* and a port-side remote control lever 7*p* respectively provided in association with the starboard-side outboard motor OMs and the port-side outboard motor OMp.

The joystick unit 18 generates an operation position signal indicating the operation position of the joystick 8, and generates an operation signal indicating the operation of any of operation buttons 180 provided in the joystick unit 18.

The remote control ECUs 51 each output a propulsive force command to the corresponding engine ECU 21 via the outboard motor control network 56. The propulsive force command includes a shift command indicating the shift position, and an output command indicating an engine output (specifically, an engine rotation speed). Further, the remote control ECUs 51 each output the steering angle command to the corresponding steering ECU 22 via the outboard motor control network 56.

The remote control ECUs 51 each perform different control operations according to different control modes of the main controller 50. In a control mode for watercraft maneuvering with the use of the steering wheel 6 and the remote control lever 7, for example, the remote control ECUs 51 each generate the propulsive force command (the shift command and the output command) according to the operation position signal generated by the remote control unit 17, and each apply the propulsive force command (the shift command and the output command) to the corresponding engine ECU 21. Further, the remote control ECUs 51 each command the corresponding steering ECU 22 to conform to the operation angle signal generated by the steering wheel unit 16. In a control mode for watercraft maneuvering without the use of the steering wheel 6 and the remote control lever 7, on the other hand, the remote control ECUs 51 each conform to commands applied by the main controller 50. That is, the main controller 50 generates the propulsive force command (the shift command and the output command) and the steering angle command, and the remote control ECUs 51 each output the propulsive force command (the shift command and the output command) and the steering angle command to the engine ECU 21 and the steering ECU 22, respectively. In a control mode for watercraft maneuvering with the use of the joystick 8 (joystick mode), for example, the main controller 50 generates the propulsive force command (the shift command and the output command) and the steering angle command according to the signals generated by the joystick unit 18. The magnitude and the direction (the forward direction or the reverse direction) of the propulsive force and the steering angle of each of the outboard motors OM are controlled according to the propulsive force command (the shift command and the output command) and the steering angle command thus generated.

The engine ECU 21 of each of the outboard motors OM drives the shift actuator 28 according to the shift command to control the shift position, and drives the throttle actuator 27 according to the output command to control the throttle opening degree of the engine 23. The steering ECU 22 of each of the outboard motors OM controls the steering actuator 25 according to the steering angle command to control the steering angle of the outboard motor OM.

The motor controller 43 of the bow thruster BT is connected to the onboard network 55, and is configured to actuate the electric motor 42 in response to a command applied from the main controller 50. The motor controller 43 may be connected to the onboard network 55 via a gateway (not shown). The main controller 50 applies a propulsive force command to the motor controller 43. The propulsive force command includes a shift command and an output command. The shift command is a rotation direction command that indicates the stop, the forward rotation or the reverse rotation of the propeller 20. The output command is a rotation speed command that indicates a propulsive force to be generated, specifically, a target rotation speed value. The motor controller 43 controls the rotation direction and the rotation speed of the electric motor 42 according to the shift command (rotation direction command) and the output command.

In this example, the operator 45 dedicated for the bow thruster BT is connected to the motor controller 43. The user can adjust the rotation direction and the rotation speed of the bow thruster BT by operating the operator 45.

The GPS receiver 52 is an exemplary position detecting device. The GPS receiver 52 detects the position of the watercraft 1 by receiving radio waves from an artificial satellite orbiting the earth, and outputs position data indicating the position of the watercraft 1 and speed data indicating the moving speed of the watercraft 1. The main controller 50 acquires the position data and the speed data, which are used to control and display the position and/or the azimuth of the watercraft 1.

The azimuth sensor 53 detects the azimuth of the watercraft 1, and generates azimuth data, which is used by the main controller 50.

The gauge 9 is also connected to the onboard network 55. The gauge 9 is a display device that displays various information for the watercraft maneuvering. The gauge 9 can communicate, for example, with the main controller 50, the remote control ECUs 51 and the motor controller 43. Thus, the gauge 9 can display information such as of the operation states of the outboard motors OM, the operation state of the bow thruster BT, and the position and/or the azimuth of the watercraft 1. The gauge 9 may include an input device 10 such as a touch panel and buttons. The input device 10 may be operated by the user to set various settings and provide various commands such that operation signals are outputted to the onboard network 55. An additional network other than the onboard network 55 may be provided to transmit display control signals related to the gauge 9.

An application switch panel 60 is connected to the onboard network 55. The application switch panel 60 includes a plurality of function switches 61 to be operated to apply predefined function commands. For example, the function switches 61 may include switches for automatic watercraft maneuvering commands. More specifically, a command for a bow holding mode (Heading Hold) in which an automatic steering operation is performed to maintain the bow azimuth during forward sailing may be assigned to one of the function switches 61, and a command for a straight sailing holding mode (Course Hold) in which an automatic steering operation is performed to maintain the bow azimuth and a straight course during forward sailing may be assigned to another of the function switches 61. Further, a command for a checkpoint following mode (Track Point™) in which an automatic steering operation is performed to follow a course (route) passing through specified checkpoints may be assigned to further another of the function switches 61, and a command for a pattern sailing mode (Pattern Steer) in which an automatic steering operation is performed to follow a predetermined sailing pattern (zig-zag pattern, spiral pattern or the like) may be assigned to still another of the function switches 61.

Figure 3:
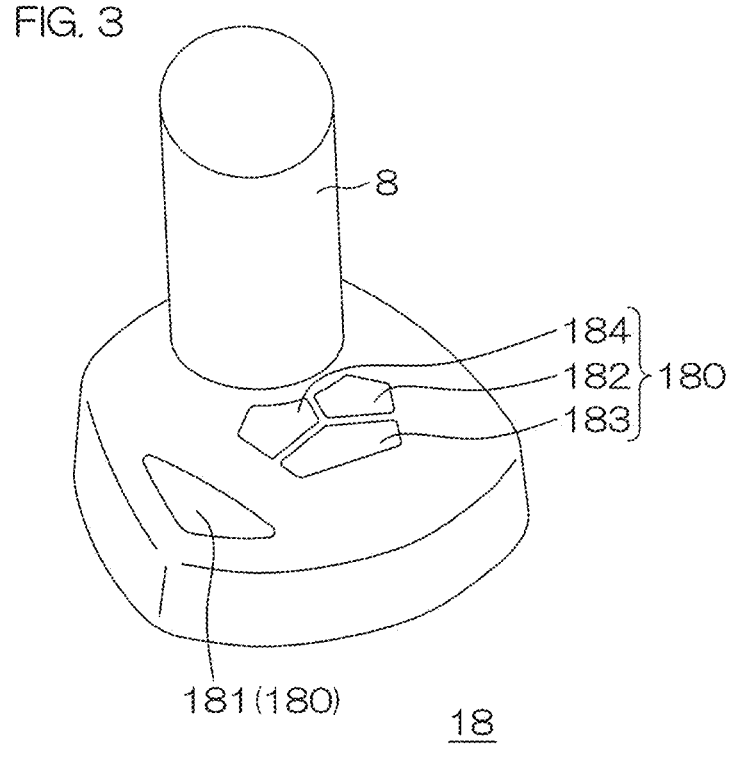
FIG. 3 is a perspective view showing the structure of a joystick unit by way of example.

FIG. 3 is a perspective view showing the structure of the joystick unit 18 by way of example. The joystick unit 18 includes the joystick 8, which can be inclined forward, backward, leftward, and rightward (i.e., in all 360-degree directions) and can be pivoted (twisted) about its axis. In this example, the joystick unit 18 further includes the operation buttons 180. The operation buttons 180 include a joystick button 181 and holding mode setting buttons 182 to 184. The joystick button 181 is an operator to be operated by the user to select a control mode (watercraft maneuvering mode) utilizing the joystick 8, i.e., the joystick mode.

The holding mode setting buttons 182, 183, 184 are operation buttons to be operated by the user to select position/azimuth holding control modes (examples of an automatic watercraft maneuvering mode). More specifically, the holding mode setting button 182 is operated to select a fixed point holding mode (Stay Point™) in which the position and the bow azimuth (or the stern azimuth) of the watercraft 1 are maintained. The holding mode setting button 183 is operated to select a position holding mode (Fish Point™) in which the position of the watercraft 1 is maintained but the bow azimuth (or the stern azimuth) of the watercraft 1 is not maintained. The holding mode setting button 184 is operated to select an azimuth holding mode (Drift Point™) in which the bow azimuth (or the stern azimuth) of the watercraft 1 is maintained but the position of the watercraft 1 is not maintained.

The control mode of the main controller 50 can be classified into an ordinary mode, the joystick mode, or the automatic watercraft maneuvering mode in terms of the operation system.

In the ordinary mode, a steering control operation is performed according to the operation angle signal generated by the steering wheel unit 16, and a propulsive force control operation is performed according to the operation signal (operation position signal) of the remote control lever 7. In this preferred embodiment, the ordinary mode is a default control mode of the main controller 50. In the steering control operation, specifically, the steering ECUs 22 of the outboard motors OM respectively drive the steering actuators 25 according to the operation angle signal generated by the steering wheel unit 16 or the steering angle commands generated by the remote control ECUs 51. Thus, the bodies of the outboard motors OM are steered leftward and rightward such that the propulsive force directions of the outboard motors OM are changed leftward and rightward with respect to the hull 2. In the propulsive force control operation, specifically, the engine ECUs 21 of the outboard motors OM drive the shift actuators 28 and the throttle actuators 27 according to the propulsive force commands (the shift commands and the output commands) applied from the remote control ECUs 51 to the engine ECUs 21. Thus, the shift positions of the outboard motors OM are each set to the forward shift position, the reverse shift position or the neutral shift position, and the engine outputs (specifically, the engine rotation speeds) of the outboard motors OM are changed.

In the joystick mode, the steering control operation and the propulsive force control operation are performed according to the operation signal of the joystick 8 of the joystick unit 18.

In the joystick mode, the steering control operation and the propulsive force control operation are performed on the outboard motors OM. That is, the main controller 50 applies the steering angle command and the propulsive force command to the remote control ECUs 51, and the remote control ECUs 51 apply the steering angle command to the steering ECUs 22 and apply the propulsive force command to the engine ECUs 21.

In the automatic watercraft maneuvering mode, the steering control operation and/or the propulsive force control operation are automatically performed by the functions of the main controller 50 and the like without the operation of the steering wheel 6, the remote control lever 7 and the joystick 8. That is, an automatic watercraft maneuvering operation is performed. The automatic watercraft maneuvering operation includes an automatic watercraft maneuvering operation to be performed on a sailing basis during sailing, and an automatic watercraft maneuvering operation to be performed on a position/azimuth holding basis to maintain the position and/or the azimuth. Examples of the automatic watercraft maneuvering operation on the sailing basis include the automatic steering operations to be selected by operating the function switches 61. Examples of the automatic watercraft maneuvering operation on the position/ azimuth holding basis include watercraft maneuvering operations to be performed in the fixed point holding mode, the position holding mode and the azimuth holding mode which are respectively selected by operating the holding mode setting buttons 182, 183, 184.

In this preferred embodiment, a cooperative mode in which the outboard motors OM and the bow thruster BT cooperate to achieve an intended hull behavior or a non-cooperative mode in which the outboard motors OM and the bow thruster BT do not cooperate can be selected in the joystick mode and the automatic watercraft maneuvering mode. A selection operator to be operated by the user to select the cooperative mode or the non-cooperative mode, for example, may be assigned to any of the function switches 61 provided on the application switch panel 60. In the cooperative mode, the main controller 50 performs the steering control operation and the propulsive force control operation on the outboard motors OM and, in addition, performs the propulsive force control operation on the bow thruster BT.

Figure 4A:
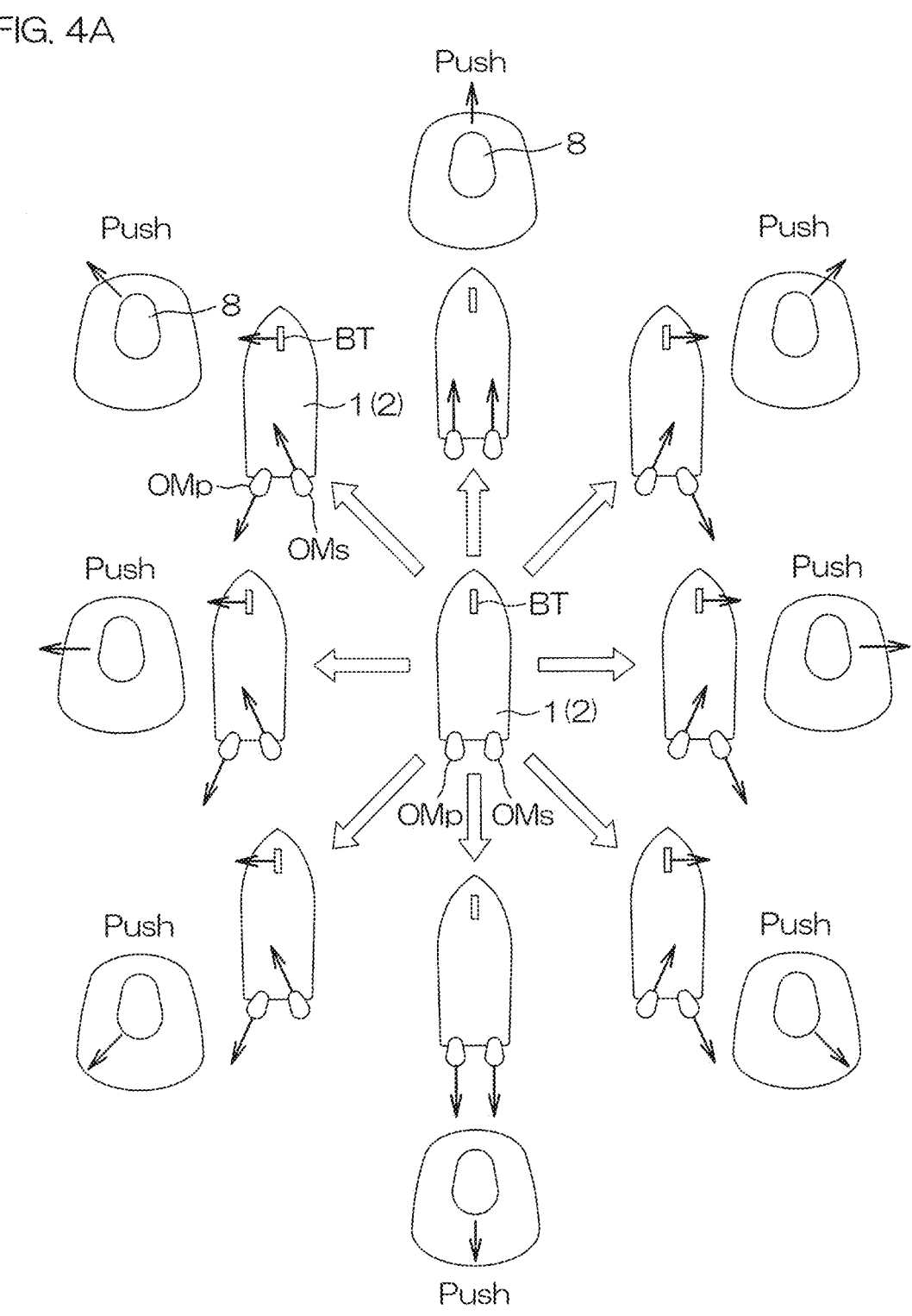
FIG. 4A is a diagram for describing a joystick mode in a cooperative mode showing operation states of a joystick and corresponding hull behaviors (translation).
Figure 4B:
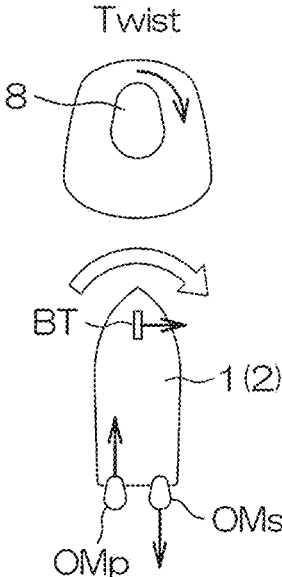
FIG. 4B is a diagram for describing the joystick mode in the cooperative mode showing operation states of the joystick and corresponding hull behaviors (fixed point bow turning).

FIGS. 4A and 4B are diagrams for describing the joystick mode in the cooperative mode, showing operation states of the joystick 8 and corresponding behaviors of the hull 2. If the joystick mode is selected by operating the joystick button 181, the main controller 50 performs a joystick mode control operation. If the cooperative mode is selected before the joystick mode is selected, or if the cooperative mode is selected after the joystick mode is selected, the main controller 50 performs the joystick mode control operation according to the cooperative mode. If the cooperative mode is not selected, the main controller 50 performs the joystick mode control operation according to the non-cooperative mode.

The main controller 50 defines the inclination of the joystick 8 as a translation command. Specifically, the main controller 50 defines the inclination direction of the joystick 8 as an advancing direction command, and defines the inclination amount of the joystick 8 as a propulsive force magnitude command that indicates the magnitude of the propulsive force to be applied in the advancing direction. Further, the main controller 50 defines the pivoting (twist-ing) of the joystick 8 about its axis is defined as a bow turning command. Specifically, the main controller 50 defines the pivoting direction of the joystick 8 about its axis (with respect to the neutral position of the joystick 8) as a bow turning direction command, and defines the pivoting amount of the joystick 8 (with respect to the neutral position of the joystick 8) as a bow turning speed command. For execution of these commands, the main controller 50 inputs the steering angle command and the propulsive force com-mand to the remote control ECUs 51, and inputs the pro-pulsive force command to the motor controller 43 of the bow thruster BT. The remote control ECUs 51 transmit the steering angle command to the steering ECUs 22 of the respective outboard motors OM, and transmit the propulsive force command to the engine ECUs 21 of the respective outboard motors OM. Thus, the outboard motors OM are respectively steered to steering angles according to the steering command, and the shift positions and the engine rotation speeds of the respective outboard motors OM are controlled to generate propulsive forces according to the propulsive force command. Further, the motor controller 43 controls the rotation direction and the rotation speed of the electric motor 42 so as to generate a propulsive force having a direction and a magnitude according to the propulsive force command. In this preferred embodiment, the joystick 8 is an example of the translation/bow turning operator to be operated by the user to apply the translation command for the translation of the hull 2 and the bow turning command for the bow turning of the hull 2.

When the joystick 8 is inclined without being pivoted in the joystick mode, the hull 2 is moved in a direction corresponding to the inclination direction of the joystick 8 without the bow turning, i.e., with its azimuth maintained. That is, the hull 2 is in a hull behavior of translation movement. Examples of the translation movement are shown in FIG. 4A. A control mode of the main controller 50 in which the translation movement is achieved according to the operation (inclination operation) of the joystick 8 as shown in FIG. 4A corresponds to the translation watercraft maneuvering mode.

Figures 5A, 5B:
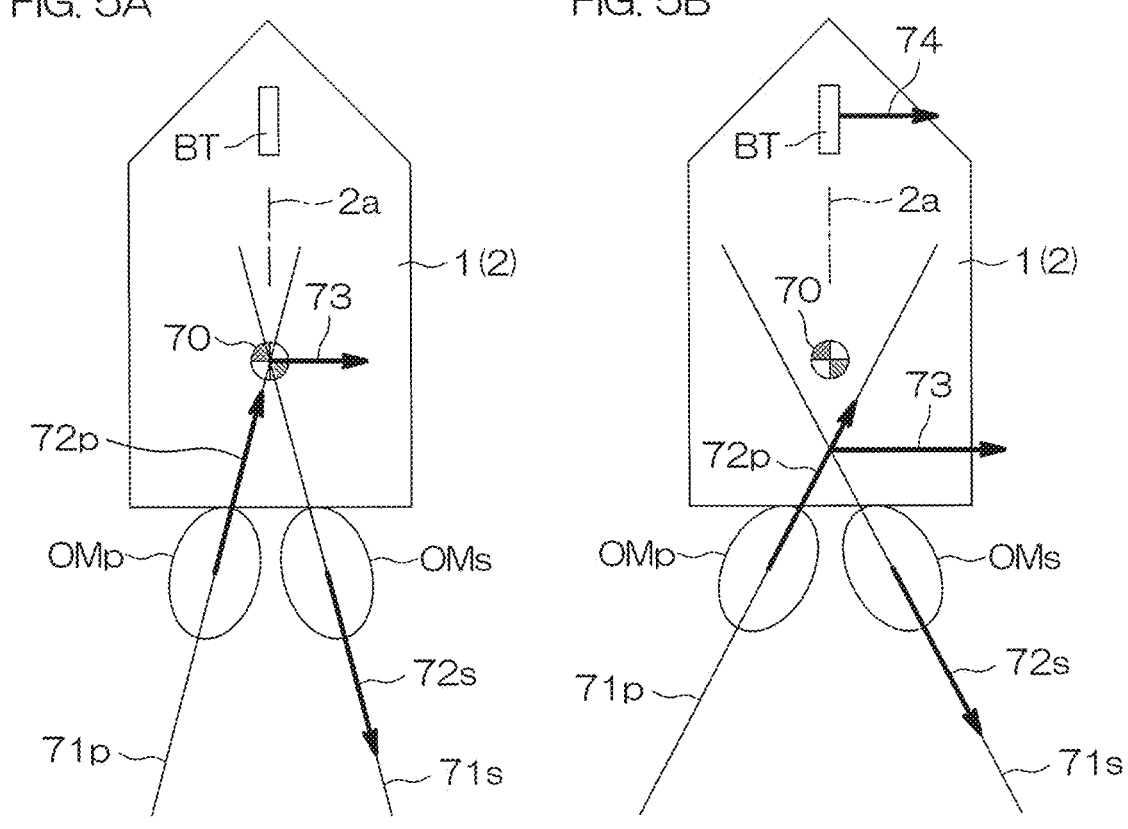
FIGS. 5A and 5B are diagrams for describing examples of the translation to be respectively observed in a non-cooperative mode and in the cooperative mode.

The translation movement is typically achieved by driving one of the outboard motors OM forward and driving the other outboard motor OM in reverse with the propulsive force action lines 71s, 71p of the two outboard motors OMs, OMp crossing each other in the hull 2 as shown in FIGS. 5A and 5B. The propulsive force action lines 71s, 71p respec-tively extend through the action points of the propulsive forces 72s, 72p of the outboard motors OMs, OMp along the directions of the propulsive forces 72s, 72p. The two out-board motors OM are steered in an inverted V-shaped orientation as seen in plan (in a so-called toe-in orientation). The steering angles of the outboard motors OM observed when the two outboard motors OM are thus steered in the inverted V-shaped orientation with their propulsive force action lines 71s, 71p crossing each other in the hull 2 are hereinafter referred to as "translation mode steering angles."

In the non-cooperative mode, as shown in FIG. 5A, the bow thruster BT is in a stop state, and the steering angles of the two outboard motors OM are controlled so that the propulsive force action lines 71s, 71p of the outboard motors OM cross each other at the turning center 70 (resistance center) of the hull 2. Thus, a resultant propulsive force 73 which is the resultant force of the propulsive forces 72s, 72p generated by the two outboard motors OMs, OMp causes the hull 2 to translate (to move laterally) without applying a moment to the hull 2. With the steering angles of the two outboard motors OMs, OMp set to the translation mode steering angles, one of the two outboard motors OMs, OMp is driven forward, and the other of the two outboard motors OMs, OMp is driven in reverse. Therefore, the resultant propulsive force 73 can have a greater lateral component with respect to the lateral direction of the hull 2. As the steering angles of the two outboard motors OMs, OMp increase in absolute value, the lateral component of the resultant propulsive force 73 is increased. In FIG. 5A and the like, the resultant propulsive force 73 is illustrated as being applied parallel to the lateral direction of the hull 2 (i.e., lateral movement) by way of example. Where the propulsive forces 72s, 72p have different magnitudes, the resultant propulsive force 73 is directed obliquely with respect to the lateral direction of the hull 2 and, therefore, is applied to the hull 2 for oblique translation.

In the cooperative mode, on the other hand, the bow thruster BT is actuated to generate a propulsive force as shown in FIG. 5B. The steering angles of the two outboard motors OM are controlled so that the propulsive force action lines 71s, 71p of the outboard motors OM cross each other on the rear side of the turning center 70 (resistance center) of the hull 2. The action point of the resultant propulsive force 73 of the propulsive forces 72s, 72p generated by the two outboard motors OM is the intersection of the propul-sive force action lines 71s, 71p, so that a moment is applied to the hull 2 about the turning center 70. On the other hand, the propulsive force 74 generated by the bow thruster BT also applies a moment to the hull 2 about the turning center 70. Therefore, the propulsive forces 72s, 72p, 74 of the outboard motors OM and the bow thruster BT are controlled so as to balance the moments applied to the hull 2 by the resultant propulsive force 73 of the two outboard motors OM and the propulsive force 74 of the bow thruster BT. Thus, the hull 2 translates (moves laterally) without the bow turning. In the cooperative mode in which the bow thruster BT and the two outboard motors OM are used in combination, the overall propulsive force contributable to the translation is greater than in the non-cooperative mode, making it possible to smoothly translate the hull 2. More specifically, the hull 2 can start moving earlier.

In this preferred embodiment, the translation mode steering angles are the steering angles of the two outboard motors OM observed when the propulsive force action lines 71$s$, 71$p$ of the two outboard motors OM cross each other on a line extending anteroposteriorly through the turning center 70 in the hull 2 (on the center line 2$a$ when the turning center 70 is on the center line 2$a$). In the non-cooperative mode, the translation mode steering angles without the bow turning of the hull 2 are the steering angles of the two outboard motors OM observed when the propulsive force action lines 71$s$, 71$p$ of the two outboard motors OM cross each other at the turning center 70. In the cooperative mode, the translation mode steering angles without the bow turning of the hull 2 are the steering angles of the two outboard motors OM observed when the propulsive force action lines 71$s$, 71$p$ of the two outboard motors OM cross each other on the rear side of the turning center 70.

When the joystick 8 is inclined and pivoted, the hull 2 is in a hull behavior such that the bow is turned in a direction corresponding to the pivoting direction of the joystick 8 while the hull 2 is moved in a direction corresponding to the inclination direction of the joystick 8. In the cooperative mode, for example, the hull 2 can be translated with the bow turning depending on the magnitude balance between the propulsive force 74 of the bow thruster BT and the resultant propulsive force 73 of the two outboard motors OM as shown in FIGS. 5C and 5D.

Figures 5C, 5D:
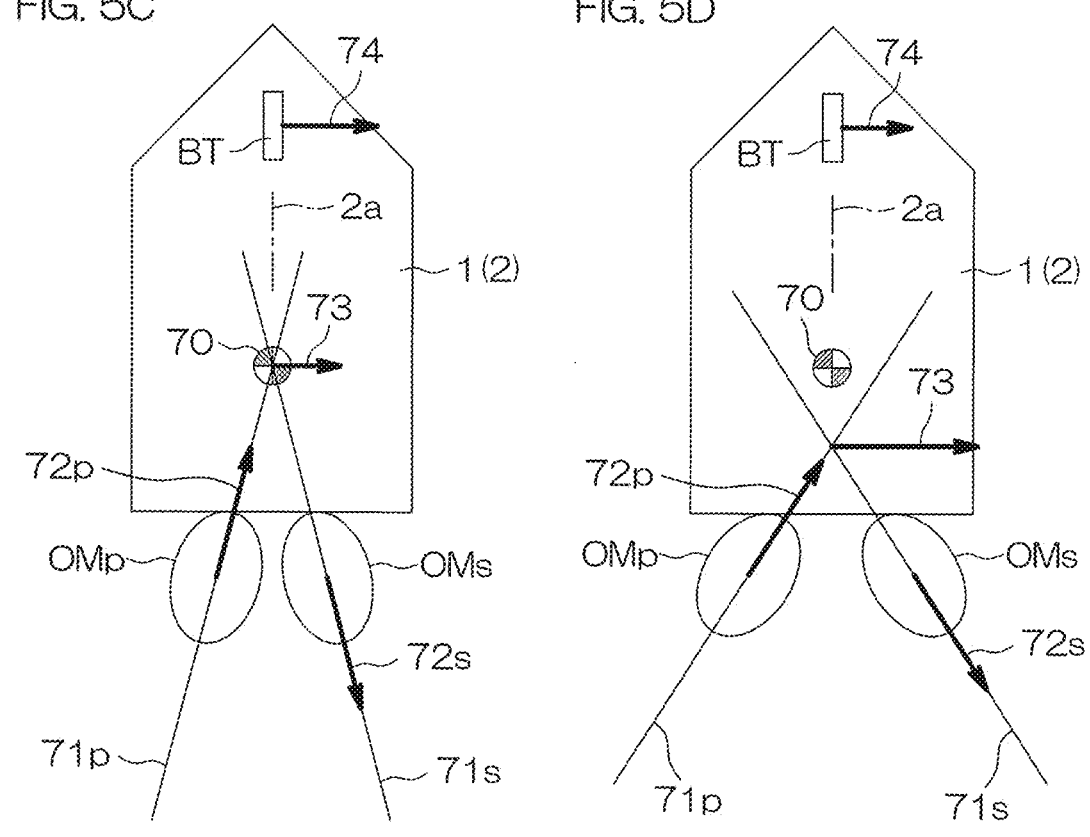
FIGS. 5C and 5D are diagrams for describing examples of the translation with bow turning in the cooperative mode.

Specifically, when the bow turning command is inputted from the joystick 8 for bow turning in a direction corresponding to the advancing direction indicated by the translation command, the main controller 50 increases the output (propulsive force) of the bow thruster BT, and reduces the absolute values of the steering angles of the outboard motors OM (see FIG. 5C). By thus reducing the absolute values of the steering angles of the outboard motors OM, the bow turning moment applied by the resultant propulsive force 73 is reduced. In FIG. 5C, the propulsive force action lines 71$s$, 71$p$ are illustrated as crossing each other at the turning center 70 by way of example, but the steering angles of the outboard motors OM may be set so that the propulsive force action lines 71$s$, 71$p$ cross each other on the front side of the turning center 70. At this time, the resultant propulsive force 73 applies the bow turning moment to the hull 2 in the same direction as that of the propulsive force 74 of the bow thruster BT. Further, when the bow turning command is inputted from the joystick 8 for bow turning in a direction opposite to the advancing direction indicated by the translation command, the main controller 50 reduces the output (propulsive force) of the bow thruster BT, and increases the absolute values of the steering angles of the outboard motors OM (see FIG. 5D). By thus increasing the absolute values of the steering angles of the outboard motors OM, the bow turning moment applied by the resultant propulsive force 73 is increased.

In the non-cooperative mode, though not shown, the hull 2 can be translated with the bow turning by controlling the steering angles of the two outboard motors OM so that the propulsive force action lines 71$s$, 71$p$ of the two outboard motors OM cross each other on the front side or the rear side of the turning center 70.

The resultant propulsive force 73 of the two outboard motors OM depends on the directions and the magnitudes of the propulsive forces 72$s$, 72$p$ of the outboard motors OM, i.e., the steering angles and the outputs (engine rotation speeds) of the respective outboard motors OM. That is, even with the same engine outputs, the resultant propulsive force 73 is relatively reduced by reducing the absolute values of the steering angles to relatively reduce (or narrow) an angle defined between the two outboard motors OM as shown in FIG. 5C. Further, even with the same engine outputs, the resultant propulsive force 73 is relatively increased by increasing the absolute values of the steering angles to relatively increase (or expand) the angle defined between the two outboard motors OM as shown in FIG. 5D.

When the joystick 8 is pivoted (twisted) without being inclined in the joystick mode, the bow of the hull 2 is turned in a direction corresponding to the pivoting direction of the joystick 8 without any substantial position change. That is, the hull 2 is in a hull behavior of fixed point bow turning. Examples of the fixed point bow turning are shown in FIG. 4B.

At this time, the steering angles of the two outboard motors OM are set to zero (bow turning mode steering angles), so that the two outboard motors OM generate propulsive forces parallel to the center line 2$a$. That is, the propulsive force action lines of the two outboard motors OM are parallel to the center line 2$a$, i.e., parallel to the anteroposterior direction of the hull 2. For the fixed point bow turning, one of the outboard motors OM is driven forward, and the other outboard motor OM is driven in reverse such that a moment can be applied to the hull 2 about the turning center. For the fixed point bow turning in a leftward direction (in a counterclockwise direction as seen in plan), the starboard-side outboard motor OMs is driven forward, and the port-side outboard motor OMp is driven in reverse. For the fixed point bow turning in a rightward direction (in a clockwise direction as seen in plan), the starboard-side outboard motor OMs is driven in reverse, and the port-side outboard motor OMp is driven forward.

In the non-cooperative mode, the bow thruster BT is in the stop state. In the cooperative mode, the bow thruster BT also generates a propulsive force to promote the bow turning. That is, the bow thruster BT applies a leftward propulsive force to the hull 2 for the fixed point bow turning in the leftward direction (in the counterclockwise direction as seen in plan). For the fixed point bow turning in the rightward direction (in the clockwise direction as seen in plan), the bow thruster BT applies a rightward propulsive force to the hull 2.

Next, description will be given to calibration to be performed for the translation watercraft maneuvering mode in the cooperative mode (see FIGS. 4A, and 5B to 5D). The position of the turning center 70 of the watercraft 1 depends upon the structure of the hull 2, the layout of various watercraft devices, cargo and the like and, therefore, is preliminarily unknown. Even with the same specifications of the outboard motors and the bow thruster, there are variations in propulsive forces to be outputted for the same propulsive force command. Therefore, watercrafts should be individually calibrated in order to achieve the hull translation movement as intended by the user.

In this case, specifically, the calibration is performed to find a calibration value which is a control parameter so that the lateral translation of the hull 2, i.e., the lateral movement without the bow turning (hereinafter referred to simply as "lateral movement"), can be properly achieved. By performing the calibration, the translation movement can be achieved according to the operation of the joystick 8 as intended by the user. Typically, the calibration includes calibration for lateral movement in a rightward direction (hereinafter referred to as "rightward lateral movement") and calibration for lateral movement in a leftward direction (hereinafter referred to as "leftward lateral movement"). A calibration value for the rightward lateral movement and a calibration value for the leftward lateral movement are generated, and stored in the memory 50b (see FIG. 2).

Specific examples of a calibration procedure and a process to be performed by the main controller 50 will be described below. Either of calibration of the rightward lateral movement and calibration of the leftward lateral movement may be performed first. A procedure and a process in which calibration of the rightward lateral movement is first performed and then calibration of the leftward lateral movement is performed will hereinafter be described. A procedure and a process in which calibration of the leftward lateral movement is first performed and then calibration of the rightward lateral movement is performed can be provided by exchanging between "rightward" and "leftward" in the following description.

Figure 6:
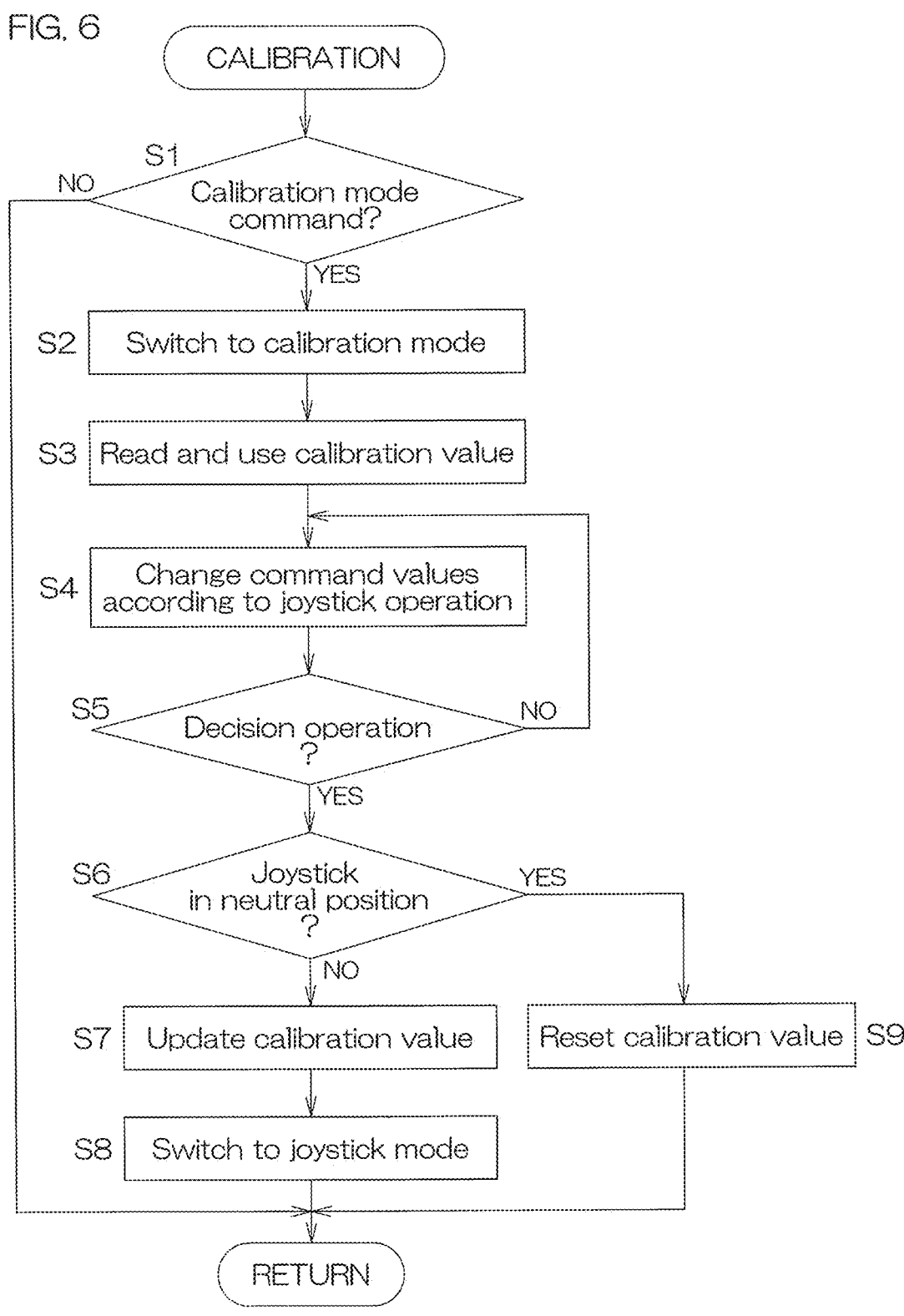
FIG. 6 is a flowchart showing an exemplary process to be performed by a main controller 50 for lateral movement calibration.

FIG. 6 is a flowchart showing the process to be performed by the main controller 50 for calibration of the lateral movement.

The user can start the calibration by performing a predetermined calibration start operation to apply a calibration mode command to the main controller 50. The calibration start operation may be, for example, the long-pressing of the joystick button 181. If the calibration start operation is performed (YES in Step S1), the control mode of the main controller 50 is switched to the calibration mode (Step S2). The user may be notified of the calibration mode by an indicator such as an LED lamp (not shown) provided in the joystick unit 18.

Upon the switching to the calibration mode, the main controller 50 reads out a calibration value from the memory 50b and, when the user operates the joystick 8, the main controller 50 generates a propulsive force command and a steering angle command by using the calibration value (Step S3). If the calibration value is used for the first time for the calibration, the calibration value is a default value preliminarily written in the memory 50b. Where the calibration has been previously performed, the calibration value is a value set for the previous calibration. However, the calibration value set for the previous calibration can be reset to the default value by a reset operation to be described below.

In the calibration mode, the user performs a lateral movement operation for lateral movement in one of opposite lateral directions for the calibration. Here, the user performs a rightward lateral movement operation, i.e., inclines the joystick 8 rightward by way of example. The user observes the behavior of the hull 2. If the hull 2 is moved right-forward, the user changes the inclination direction of the joystick 8 to a right rearward direction in order to correct the hull movement. If the hull 2 is moved right-rearward, the user changes the inclination direction of the joystick 8 to a right forward direction in order to correct the hull movement. If the bow of the hull 2 is turned clockwise, the user twists the joystick 8 counterclockwise in order to correct the bow turning. If the bow of the hull 2 is turned counterclockwise, the user twists the joystick 8 clockwise in order to correct the bow turning.

According to the operation of the joystick 8, the operation signal of the joystick 8 is inputted from the joystick unit 18 to the main controller 50. According to the operation signal, the main controller 50 changes the propulsive force command for the bow thruster BT and the propulsive force command and the steering angle command for the outboard motors OM (Step S4). If the operation state of the joystick 8 is such that the hull 2 can thus achieve the rightward lateral movement behavior, the user performs a decision operation (YES in Step S5). For example, the joystick button 181 may be pressed for the decision operation. In this case, the joystick button 181 is an example of the calibration ending operator.

In response to the decision operation, the main controller 50 determines whether or not the joystick 8 is in the neutral position (Step S6). If the joystick 8 is not in the neutral position, a calibration value for the rightward lateral movement is written and set in the memory 50b (Step S7). The calibration value written in the memory 50b is used when the main controller 50 thereafter computes the propulsive force command and the steering angle command according to the operation of the joystick 8 for the watercraft maneuvering with the use of the joystick 8. The calibration value for the rightward lateral movement is used for the computation of the propulsive force command and the steering angle command when an inclination operation including a rightward inclination component is performed on the joystick 8 (i.e., the translation command includes a rightward movement component) in the joystick mode.

The main controller 50 computes the calibration value based on the control states of the bow thruster BT and the two outboard motors OM observed when the decision operation is performed (Step S5), and writes the calibration value in the memory 50b. Specific examples of the calibration value will be described below. The control mode is thereafter switched to the joystick mode (Step S8).

If the joystick 8 is in the neutral position (YES in Step S6) when the decision operation is performed (Step S5), the main controller 50 determines that the reset operation is performed to reset the calibration value to the default value. In this case, the main controller 50 resets the calibration value to the default value (Step S9). Thereafter, the control mode is switched to the joystick mode (Step S8).

Calibration of the lateral movement in the other lateral direction (i.e., calibration of the leftward lateral movement) can be thereafter performed in the same manner, and the calibration value for the leftward lateral movement can be stored in the memory 50b. The user can perform calibration of the leftward lateral movement in the following manner.

The user performs a leftward lateral movement operation, i.e., inclines the joystick 8 leftward, for calibration of the leftward lateral movement. The user observes the behavior of the hull 2. If the hull 2 is moved left-forward, the user changes the inclination direction of the joystick 8 to a left rearward direction in order to correct the hull movement. If the hull 2 is moved left-rearward, the user changes the inclination direction of the joystick 8 to a left forward direction in order to correct the hull movement. If the bow of the hull 2 is turned clockwise, the user twists the joystick 8 counterclockwise in order to correct the bow turning. If the bow of the hull 2 is turned counterclockwise, the user twists the joystick 8 clockwise in order to correct the bow turning. If the operation state of the joystick 8 is such that the hull 2 can thus achieve the leftward lateral movement behavior, the user performs the decision operation (by pressing the joystick button 181 in this preferred embodiment).

Figure 7A:
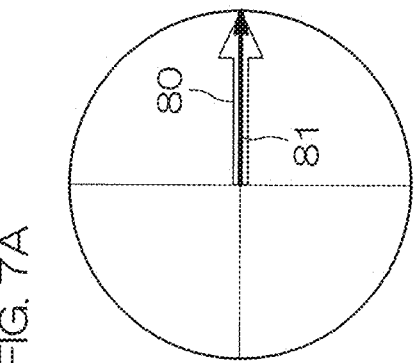
FIGS. 7A to 7C are diagrams for describing exemplary calibration values.
Figure 7B:
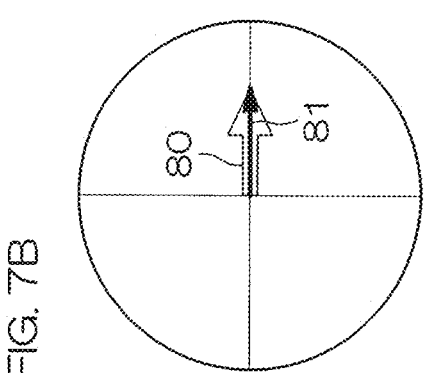
Figure 7C:
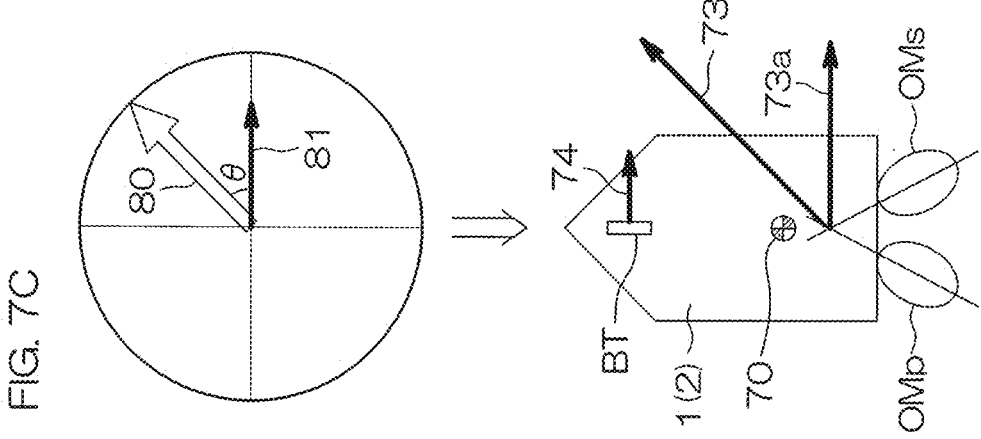

FIGS. 7A to 7C are diagrams for describing specific examples of the calibration value. The calibration value will hereinafter be described with reference to FIG. 5B as well as FIGS. 7A to 7C.

For example, the calibration value includes translation steering angles to which the steering angles of the two outboard motors OM are to be set for the lateral movement in the translation watercraft maneuvering mode (reference translation steering angles for the lateral movement) (see FIG. 5B). The calibration value further includes a forward/reverse thrust ratio. The forward/reverse thrust ratio is a ratio between the magnitude of the forward propulsive force generated by one of the two outboard motors OM driven forward (forward thrust) and the magnitude of the reverse propulsive force generated by the other outboard motor OM driven in reverse (reverse thrust). That is, (forward/reverse thrust ratio)=(forward thrust)/(reverse thrust). In the example shown in FIG. 5B, the forward thrust corresponds to the magnitude of the propulsive force 72$p$ of the port-side outboard motor OMp driven forward, and the reverse thrust corresponds to the magnitude of the propulsive force 72$s$ of the starboard-side outboard motor OMs driven in reverse.

The calibration value further includes a reference ratio that indicates the ratio of the output of the bow thruster BT to the lateral component of a target thrust corresponding to the translation command applied from the joystick 8. The reference ratio will hereinafter be described with reference to FIGS. 7A to 7C.

The main controller 50 sets the target thrust 80 according to the inclination amount and the inclination direction of the joystick 8. Here, the target thrust 80 is a vector quantity having a direction and a magnitude. The direction of the target thrust 80 is the target advancing direction of the hull 2, and corresponds to the inclination direction of the joystick 8. The magnitude of the target thrust 80 is typically monotonically increased as the inclination amount of the joystick 8 increases. Where the inclination amount is maximum, the magnitude of the target thrust 80 is maximum.

The main controller 50 generates the propulsive force command and the steering angle command for the two outboard motors OM so as to generate the target thrust 80 according to the inclination direction and the inclination amount of the joystick 8. The shift command of the propulsive force command indicates the forward driving or the reverse driving, and the output command of the propulsive force command indicates an output corresponding to the target thrust 80. Where no bow turning command is inputted from the joystick unit 18, the steering angle command indicates the reference translation steering angles (see FIG. 5B).

The main controller 50 generates the propulsive force command for the bow thruster BT by multiplying the lateral component 81 of the target thrust 80 by the reference ratio which is one of the exemplary calibration values. Where the target thrust 80 forms an angle θ with respect to the rightward direction, for example, the lateral component 81 of the target thrust 80 can be determined by multiplying the target thrust 80 by cos θ. The lateral component 81 thus determined represents the lateral component force 73$a$ of the resultant propulsive force 73 of the two outboard motors OM with its sign representing its direction (a rightward or leftward direction) and with its absolute value representing its magnitude. The lateral component force 73$a$ applies a bow turning moment to the hull 2 about the turning center 70. A propulsive force command that commands the bow thruster BT to generate a bow turning moment for cancellation of the bow turning moment applied by the lateral component force 73$a$ is provided by multiplying the lateral component 81 of the target thrust 80 by the reference ratio. The sign of the propulsive force command represents the direction of the propulsive force 74 to be generated by the bow thruster BT (the rotation direction of the propeller 40), and the absolute value of the propulsive force command represents the output of the bow thruster BT (the magnitude of the propulsive force 74).

An exemplary case will be considered, in which the target thrust 80 has a maximum magnitude of 1 kN and the reference ratio determined by the calibration is 100. The output of the bow thruster BT is herein expressed by percentage (%).

When the joystick 8 is inclined laterally (e.g., rightward) by a maximum inclination amount as shown in FIG. 7A, the target thrust 80 has a magnitude of 1 kN as measured laterally. At this time, the lateral component 81 of the target thrust 80 is 1 kN and, therefore, the target output of the bow thruster BT is 100%, which is determined by multiplying 1 kN by a reference ratio of 100.

Where the joystick 8 is inclined laterally (e.g., rightward) by about 50% of the maximum inclination amount as shown in FIG. 7B, the target thrust 80 has a magnitude of 0.5 kN as measured laterally. At this time, the lateral component 81 of the target thrust 80 is 0.5 kN and, therefore, the target output of the bow thruster BT is 50%, which is determined by multiplying 0.5 kN by a reference ratio of 100.

Where the joystick 8 is inclined in a direction extending at an angle θ with respect to a lateral direction (e.g., a rightward direction) by the maximum inclination amount as shown in FIG. 7C, the target thrust 80 has a magnitude of 1 kN as measured in the direction extending at the angle θ. At this time, the lateral component 81 of the target thrust 80 is 1 kN×cos θ and, therefore, the target output of the bow thruster BT is 100×cos θ%, which is determined by multiplying 1 kN×cos θ by a reference ratio of 100.

The oblique target thrust 80 can be achieved by adjusting the magnitudes of the propulsive forces generated by the starboard-side and port-side outboard motors OM. For example, the target propulsive forces of the starboard-side and port-side outboard motors OM may be determined by making correction according to the anteroposterior component of the target thrust 80 based on the forward/reverse thrust ratio. Thus, the two outboard motors OM can generate the resultant propulsive force 73 in the oblique direction. The bow turning moment generated by the lateral component force 73$a$ of the resultant propulsive force 73 is cancelled by the propulsive force 74 of the bow thruster BT such that the hull 2 can be translated in the oblique direction.

Figure 8:
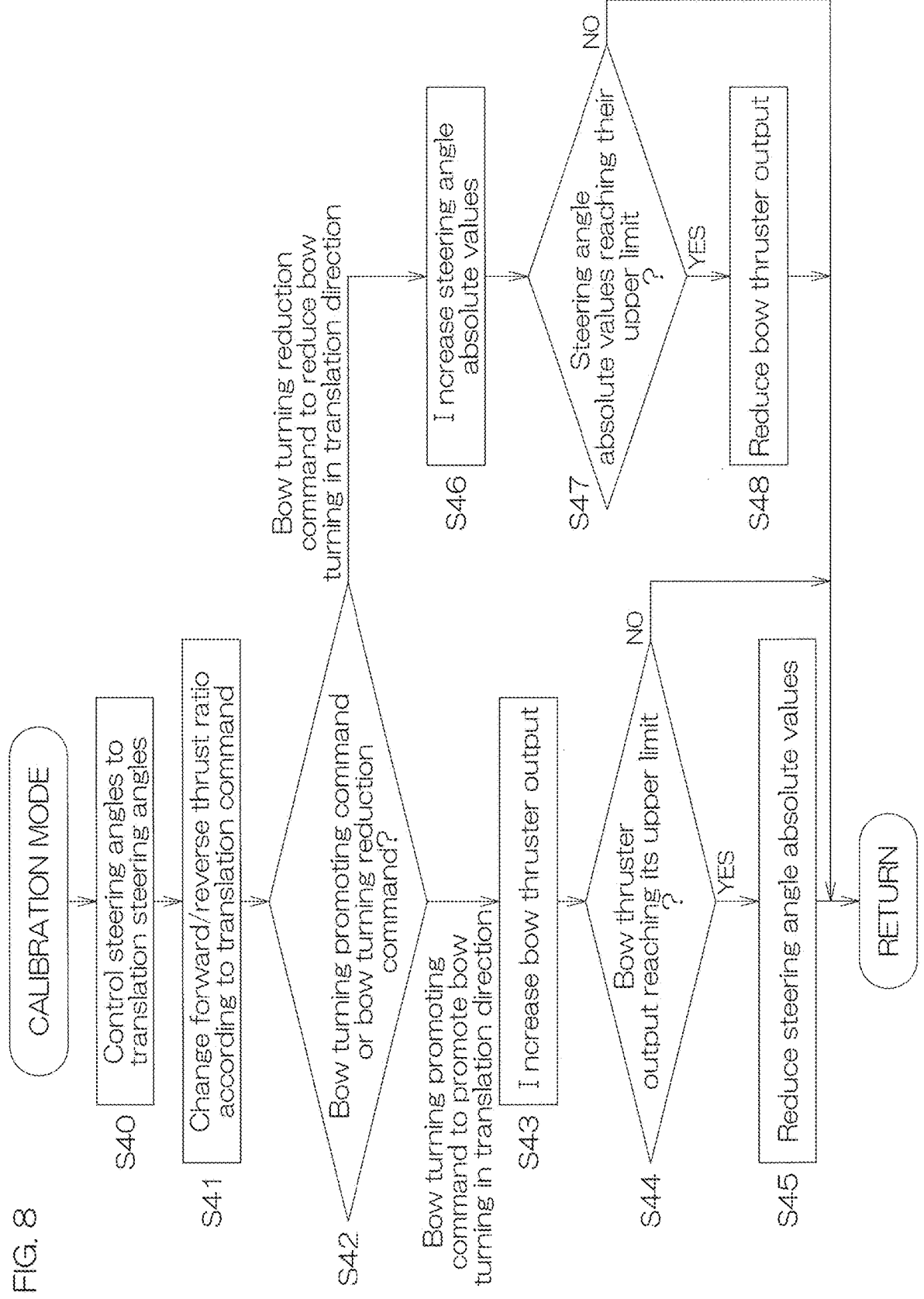
FIG. 8 is a flowchart showing an exemplary control operation to be performed according to a translation command and a bow turning command in a calibration mode.

FIG. 8 is flowchart showing an exemplary control operation to be performed according to the translation command and the bow turning command in the calibration mode, particularly showing an example of the process in Step S4 in FIG. 6.

When the calibration mode is started, the main controller 50 steers the two outboard motors OM to the translation steering angles based on the previous calibration value (or the default value) stored in the memory 50$b$ (Step S40). When the user inclines the joystick 8 laterally, the main controller 50 applies the propulsive force command to the two outboard motors OM and the bow thruster BT to drive the two outboard motors OM and the bow thruster BT. If the hull 2 is not moved laterally, the user changes the inclination direction of the joystick 8 to correct the movement direction of the hull 2. The main controller 50 changes the forward/reverse thrust ratio according to the input of the translation command corresponding to the operation of the joystick 8, and applies a new propulsive force command to the two outboard motors OM and the bow thruster BT (Step S41).

If the bow of the hull 2 is turned, the user twists the joystick 8. If the bow turning command applied by the twisting of the joystick 8 is a bow turning promoting command that commands the bow turning in the direction indicated by the translation command (to promote the bow turning in the translation direction) (Step S42), the main controller 50 increases the output of the bow thruster BT (Step S43). Specific examples of such a situation include a situation in which the bow turning command for the bow turning in the rightward direction (in the clockwise direction) is applied together with the translation command for the translation in the rightward direction, and a situation in which the bow turning command for the bow turning in the leftward direction (in the counterclockwise direction) is applied together with the translation command for the translation in the leftward direction. During this period, the steering angles of the outboard motors OM are not changed. If the bow turning promoting command is still applied even after the output of the bow thruster BT reaches its upper limit (YES in Step S44), the main controller 50 reduces the absolute values of the steering angles of the two outboard motors OM (Step S45). That is, the steering angles of the two outboard motors OM are changed so as to narrow (reduce) a distance between the rear ends of the two outboard motors OM. During this period, the output of the bow thruster BT is kept at its upper limit.

On the other hand, if the bow turning command applied by the twisting of the joystick 8 is a bow turning reduction command that commands the bow turning in the direction opposite to the direction indicated by the translation command (to reduce the bow turning in the translation direction) (Step S42), the main controller 50 increases the absolute values of the steering angles of the two outboard motors OM (Step S46). Specific examples of such a situation include a situation in which the bow turning command for the bow turning in the leftward direction (in the counterclockwise direction) is applied together with the translation command for the translation in the rightward direction, and a situation in which the bow turning command for the bow turning in the rightward direction (in the clockwise direction) is applied together with the translation command for the translation in the leftward direction. In this case, the steering angles of the two outboard motors OM are changed so as to expand (increase) the distance between the rear ends of the two outboard motors OM. During this period, the output of the bow thruster BT is not changed. If the bow turning reduction command is still applied even after the absolute values of the steering angles reach their upper limit (YES in Step S47), the main controller 50 reduces the output of the bow thruster BT (Step S48). During this period, the absolute values of the steering angles are kept at their upper limit.

In this manner, the bow non-turning state of the hull 2 can be reliably achieved by changing the output of the bow thruster BT with the steering angles of the outboard motors OM fixed or by changing the steering angles of the outboard motors OM with the output of the bow thruster BT fixed in response to the bow turning command applied by the twisting of the joystick 8. Further, the adjustment of the output of the bow thruster BT is prioritized for the bow turning promoting command, and the adjustment of the steering angles of the outboard motors OM is prioritized for the bow turning reduction command such that the absolute values of the steering angles can be maximized. Thus, the translation steering angles can be calibrated so as to efficiently utilize the lateral component of the resultant force of the propulsive forces generated by the outboard motors OM so that the hull translation behavior can be promoted.

If the translation command is applied from the joystick unit 18 in the ordinary translation watercraft maneuvering mode after the calibration, the main controller 50 controls the output of the bow thruster BT, the steering angles of the two outboard motors OM, and the propulsive forces of the two outboard motors OM based on the calibration value. If the bow turning command is applied from the joystick unit 18, the main controller 50 changes the steering angles of the two outboard motors OM and, at the same time, changes the output of the bow thruster BT. Thus, the watercraft propulsion system 100 and the watercraft 1 provide that the bow turning behavior of the hull 2 is highly responsive to the operation of the joystick 8.

Figure 9A:
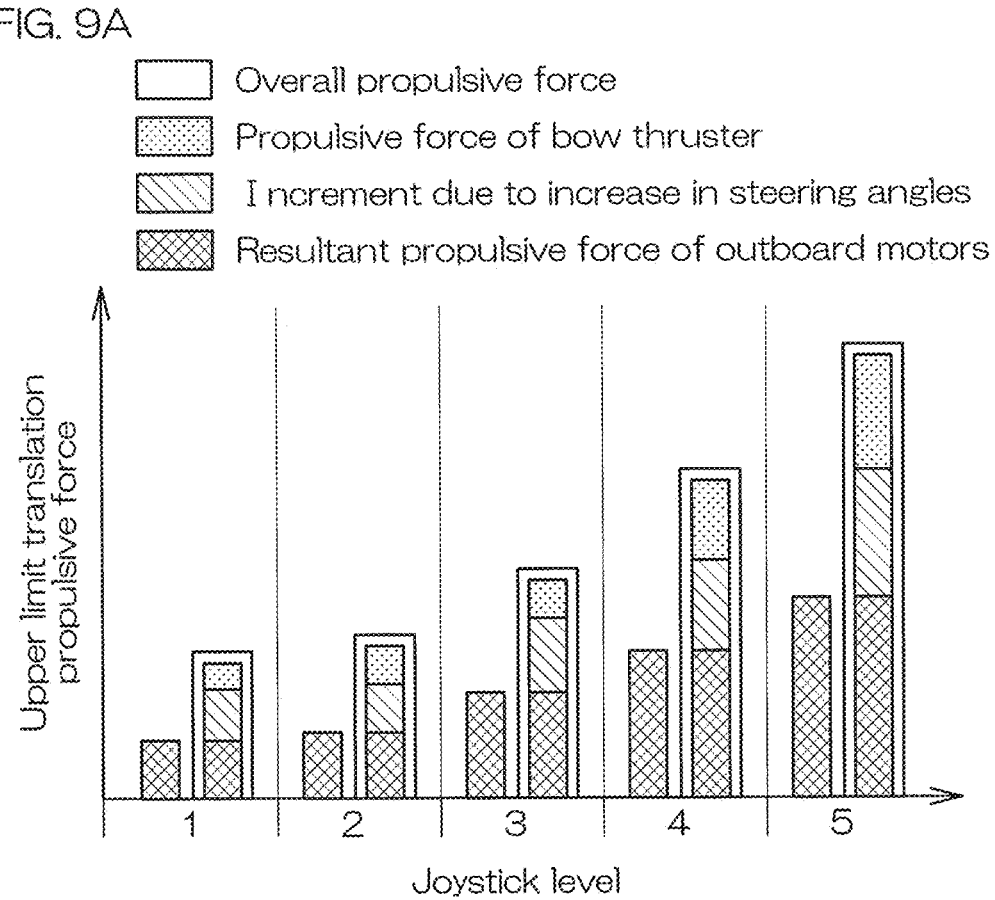
FIGS. 9A and 9B are diagrams for describing the features of the setting of a joystick level.

FIG. 9A is a diagram for describing the variable setting of the upper limit of a translation propulsive force to be generated in the joystick mode. The setting may be achieved, for example, by operating the input device 10 (an example of the upper output limit setter). In the example shown in FIG. 9A, a joystick level can be set on a scale of 1 to 5. As the joystick level increases, the upper limit translation propulsive force is increased stepwise.

In the graph of FIG. 9A, a left one of two bars for each of the joystick levels 1 to 5 represents an upper limit translation propulsive force to be generated in the non-cooperative mode, and a right one of the two bars for each of the joystick levels 1 to 5 represents an upper limit translation propulsive force to be generated in the cooperative mode. In the non-cooperative mode, the translation propulsive force includes only the resultant propulsive force 73 (see FIG. 5A) of the propulsive forces generated by the outboard motors OM with the steering angles of the outboard motors OM set to the translation steering angles for the non-cooperative mode (see FIG. 5A). In the cooperative mode, the absolute values of the translation steering angles are increased (see FIG. 5B) and, therefore, the translation propulsive force additionally includes an increment in the resultant propulsive force 73 due to the increase in the absolute values of the translation steering angles. Further, the translation propulsive force additionally includes the propulsive force 74 generated by the bow thruster BT (see FIG. 5B).

As the joystick level increases, the resultant propulsive force 73 (see FIGS. 5A and 5B) generated by the outboard motors OM is increased. Further, as the joystick level increases, the propulsive force 74 (see FIG. 5B) generated by the bow thruster BT is increased. The increment in the resultant propulsive force 73 due to the setting of the translation steering angles varies according to the propulsive forces generated by the outboard motors OM.

Thus, the upper limit output of the bow thruster BT is indirectly set by setting the joystick level. In the calibration described above, the calibration value is determined by adjusting the output of the bow thruster BT within a range not greater than the upper limit output thus set.

Figure 9B:
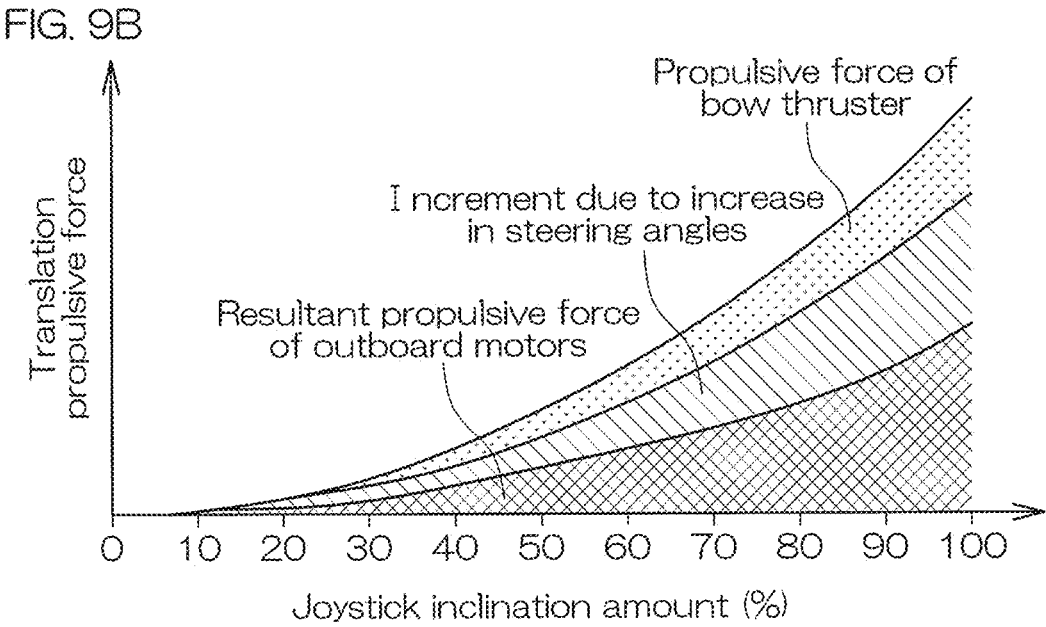

FIG. 9B shows an exemplary relationship between the inclination amount (%) of the joystick 8 and the translation propulsive force where the joystick level is 5. As the inclination amount of the joystick 8 increases, the translation propulsive force is monotonically increased in a range not greater than the upper limit translation propulsive force. More specifically, as the inclination amount of the joystick 8 increases, the resultant propulsive force 73 (see FIGS. 5A and 5B) generated by the outboard motors OM is monotonically increased, and the increment in the resultant propulsive force 73 due to the setting of the translation steering angles is correspondingly monotonically increased. As the inclination amount of the joystick 8 increases, the propulsive force 74 (see FIG. 5B) generated by the bow thruster BT is also monotonically increased.

While preferred embodiments of the present invention have thus been described, the present invention may be embodied in some other ways.

In a preferred embodiment described above, the two outboard motors OM are provided on the stern 3 by way of example. The number of the outboard motors OM may be three or more. In a preferred embodiment described above, the engine outboard motors are used as the propulsion devices by way of example, but instead electric outboard motors may be used. Further, the propulsion devices are not necessarily required to be the outboard motors, but may be inboard motors, inboard/outboard motors (stern drives), waterjet propulsion devices and other types of propulsion devices.

In a preferred embodiment described above, the bow thruster BT is able to generate the propulsive force only laterally leftward and rightward by way of example. Alternatively, a steerable propulsion device such as an electric trolling motor may be provided at the bow instead of the propulsion device able to generate the propulsive force only laterally leftward and rightward. That is, the bow thruster may be a propulsion device provided at the bow and able to generate the propulsive force laterally leftward and rightward and further generate the propulsive force in directions other than the leftward and rightward directions.

In a preferred embodiment described above, the watercraft propulsion system 100 includes the cooperative mode in which the outboard motors OM and the bow thruster BT are controlled in a cooperative manner, and the non-cooperative mode in which the cooperative control is not performed by way of example. However, the non-cooperative mode may be omitted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft propulsion system comprising:
a bow thruster at a bow of a hull to generate a lateral propulsive force;
at least two propulsion devices on a stern of the hull each having a variable steering angle;
a translation/bow turning operator to be operated by a user to apply a translation command to translate the hull and a bow turning command to turn the bow of the hull; and
a controller configured or programmed to control the bow thruster and the at least two propulsion devices; wherein
the controller is configured or programmed to, in a translation watercraft maneuvering mode, drive the bow thruster, and drive one of the at least two propulsion devices forward and drive another of the at least two propulsion devices in reverse while controlling the steering angles of the at least two propulsion devices so that propulsive force action lines of the at least two propulsion devices cross each other in the hull to translate the hull in response to an operation of the translation/bow turning operator;
the controller includes a calibration mode in which calibration is performed for the translation watercraft maneuvering mode;

the controller is configured or programmed to control the bow thruster and the at least two propulsion devices according to the translation command and the bow turning command applied by the translation/bow turning operator in the calibration mode; and
the controller is configured or programmed to increase an output of the bow thruster when the bow turning command is a bow turning promoting command that commands bow turning in a direction indicated by the translation command, and to reduce absolute values of the steering angles of the at least two propulsion devices when the bow turning promoting command is still applied even after the output of the bow thruster reaches an upper limit.

2. The watercraft propulsion system according to claim 1, wherein the controller is configured or programmed to increase the absolute values of the steering angles of the at least two propulsion devices when the bow turning command is a bow turning reduction command that commands bow turning in a direction opposite to the direction indicated by the translation command, and to reduce the output of the bow thruster when the bow turning reduction command is still applied even after the absolute values of the steering angles reach an upper limit.

3. The watercraft propulsion system according to claim 1, further comprising:
a calibration ending operator to be operated by the user to end the calibration; wherein
the controller is configured or programmed to generate a calibration value based on control states of the bow thruster and the at least two propulsion devices when the calibration ending operator is operated, and to store the calibration value in a memory.

4. The watercraft propulsion system according to claim 3, wherein the calibration value includes translation steering angles to which the steering angles of the at least two propulsion devices are to be set in the translation watercraft maneuvering mode, a reference ratio that indicates a ratio of the output of the bow thruster to a lateral component of a target thrust corresponding to the translation command applied by the translation/bow turning operator, and a forward/reverse thrust ratio that indicates a ratio between a propulsive force of one of the at least two propulsion devices driven forward and a propulsive force of the another of the at least two propulsion devices driven in reverse.

5. The watercraft propulsion system according to claim 3, wherein the controller is configured or programmed to control the output of the bow thruster, the steering angles of the at least two propulsion devices, and propulsive forces of the at least two propulsion devices based on the calibration value when the translation command is applied by the translation/bow turning operator in the translation watercraft maneuvering mode.

6. The watercraft propulsion system according to claim 1, wherein the controller is configured or programmed to increase the output of the bow thruster, and reduce absolute values of the steering angles of the propulsion devices when a bow turning command that commands the bow turning in the direction indicated by the translation command is applied by the translation/bow turning operator in the translation watercraft maneuvering mode.

7. The watercraft propulsion system according to claim 1, wherein the controller is configured or programmed to reduce the output of the bow thruster, and increase the absolute values of the steering angles of the propulsion devices when a bow turning command that commands bow turning in a direction opposite to the direction indicted by the translation command is applied by the translation/bow turning operator in the translation watercraft maneuvering mode.

8. The watercraft propulsion system according to claim 1, further comprising an upper output limit setter to be operated by the user to set an upper limit of the output of the bow thruster.

9. A watercraft propulsion system comprising:

a bow thruster at a bow of a hull to generate a lateral propulsive force;

at least two propulsion devices on a stern of the hull each having a variable steering angle;

a translation/bow turning operator to be operated by a user to apply a translation command to translate the hull and a bow turning command to turn the bow of the hull; and a controller configured or programmed to control the bow thruster and the at least two propulsion devices; wherein the controller is configured or programmed to, in a translation watercraft maneuvering mode, drive the bow thruster, and drive one of the at least two propulsion devices forward and drive another of the at least two propulsion devices in reverse while controlling the steering angles of the at least two propulsion devices so that propulsive force action lines of the at least two propulsion devices cross each other in the hull to translate the hull in response to the operation of the translation/bow turning operator;

the controller includes a calibration mode in which calibration is performed for the translation watercraft maneuvering mode;

the controller is configured or programmed to control the bow thruster and the at least two propulsion devices according to the translation command and the bow turning command applied by the translation/bow turning operator in the calibration mode; and the controller is configured or programmed to increase absolute values of the steering angles of the at least two propulsion devices when the bow turning command is a bow turning reduction command that commands bow turning in a direction opposite to a direction indicated by the translation command, and to reduce an output of the bow thruster when the bow turning reduction command is still applied even after the absolute values of the steering angles reach their upper limit.

10. A watercraft comprising:

a hull; and the watercraft propulsion system according to claim 1 on the hull.

11. A watercraft comprising:

a hull; and the watercraft propulsion system according to claim 9 on the hull.

*     *     *     *     *